United States Patent [19]

Takahashi et al.

[11] Patent Number: 5,081,181

[45] Date of Patent: Jan. 14, 1992

[54] PRIMER COMPOSITION

[75] Inventors: Masaharu Takahashi; Jun Hatakeyama, both of Annaka, Japan

[73] Assignee: Shin-Etsu Chemical Co., Ltd., Tokyo, Japan

[21] Appl. No.: 470,134

[22] Filed: Jan. 25, 1990

[30] Foreign Application Priority Data

Jan. 27, 1989 [JP] Japan .................................. 1-018150

[51] Int. Cl.$^5$ ............................................... C08K 5/05
[52] U.S. Cl. ...................................... 524/766; 524/865; 524/765; 524/768; 524/773; 524/792; 528/17; 528/32; 528/34; 528/33; 528/901
[58] Field of Search ............... 524/865, 765, 766, 768, 524/773, 792; 528/17, 32, 34, 33, 901

[56] References Cited

U.S. PATENT DOCUMENTS

| | | | |
|---|---|---|---|
| 3,409,573 | 11/1968 | Guinet et al. | 528/17 |
| 3,619,255 | 11/1971 | Lengnick | 528/17 |
| 3,642,692 | 2/1972 | Hartlage | 528/17 |
| 3,714,109 | 1/1973 | Matherly et al. | 528/17 |
| 3,914,199 | 10/1975 | Lee et al. | 260/32.8 SB |
| 4,151,344 | 4/1979 | Doss et al. | 528/17 |
| 4,388,433 | 6/1983 | Klein et al. | 524/865 |

FOREIGN PATENT DOCUMENTS

| | | |
|---|---|---|
| 0044672 | 1/1982 | European Pat. Off. |
| 3838330 | 6/1989 | Fed. Rep. of Germany |
| 2068397 | 8/1981 | United Kingdom |

OTHER PUBLICATIONS

Patent Abstracts of Japan, vol. 6, No. 257 (C-140)(1135) Dec. 16, 1982, & JP-A-57 149371 (Toray) Sep. 14, 1982, * the whole document *.

Primary Examiner—Paul R. Michl
Assistant Examiner—Karen A. Hellender
Attorney, Agent, or Firm—Oblon, Spivak, McClelland, Maier & Neustadt

[57] ABSTRACT

A primer composition comprising:
(A) an organosilicon compound formed by binding an organosilicon compound represented by the general formula (I):

$$H_a(R^1)_b(XO)_c SiO_{\frac{4-a-b-c}{2}} \quad (I)$$

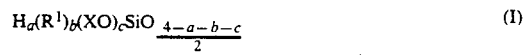

wherein $R^1$ represents a monovalent hydrocarbon group; X represents a hydrogen atom, a lower alkyl group, etc.; and $0 \leq a < 0.2$, $0 \leq b < 0.2$ and $1 < c < 4$, with an organopolysiloxane represented by the general formula (II):

$$(R^2)_d(R^3)_e(YO)_f SiO_{\frac{4-d-e-f}{2}} \quad (II)$$

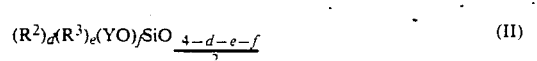

wherein $R^2$ represents a monovalent hydrocarbon group containing no aliphatic unsaturated group; $R^3$ represents an alkenyl group; Y represents a hydrogen atom, a lower alkyl group, etc.; and $1.8 < d < 2.2$, $0.004 < e < 0.2$ and $0 \leq f < 0.2$, in a particular proportion;
(B) an organic titanate; and
(C) an organic solvent.

This primer composition achieves adhesion with good durability at high temperatures, particularly in high temperature oils.

10 Claims, 1 Drawing Sheet

PRIMER COMPOSITION

BACKGROUND OF THE INVENTION

1. Field of the Invention

This invention relates to a primer composition. More particularly, it relates to a primer composition suited for the achievement of strong adhesion of silicone rubber on the surface of a metal, plastics or the like.

2. Description of Prior art

Silicone rubber is used for various purposes because of its excellent physical and chemical properties. It is also used as a material to form a composite with metals or plastics. In the manufacture of such a composite, for example, a method is employed in which a primer composition comprising i) an alkoxysilane having an unsaturated bond, such as vinyltrimethoxysilane, vinyltri(2-methoxyethoxy)silane or 3-methacryloxypropyltrimethoxysilane, or a hydrolysis condensate thereof or a co-hydrolysis siloxane, ii) a titanate and iii) a metal salt of an organic fatty acid is previously coated on the surface of a metal or plastics, and thereafter a silicone rubber is applied to the resulting coating, and cured, whereupon the silicon rubber is adhered. The adhesion surface thus formed has the disadvantage that it can not maintain the adhesion for a long period time at temperatures higher than 200° C., for instance, and may cause peeling in high-temperature oils.

In those circumstances, a rubbery composition comprising a vinyl group-containing organopolysiloxane, a polysiloxane resin, an alkoxysilane, an organic peroxide and a catalyst has been proposed as a composition improved in high-temperature resistance and high temperature oil resistance (see Japanese Patent Publication (KOKOKU) No. 30817/1981). This composition can improve the adhesion under conditions of high temperatures and in high-temperature oils, but has the disadvantages not only that it is compositionally so complicated that its manufacture is laborious and time-consuming, but also that part or the whole of a primer layer is peeled because of the flow of the rubber compound injected at the time of injection molding. From the viewpoint of working or processing, the composition also has the disadvantage that it has so poor air-drying properties that constant heating is required to prevent the primer layer from flowing.

Japanese Patent Publication No. 163968/1985 also proposes a primer composition comprising as a main component a silazane bond-containing organosilicone, which has good air-drying properties and high coating strength. This can attain good adhesion, but, from the viewpoint of processing, has the disadvantage that it has a short pot life.

SUMMARY OF THE INVENTION

Accordingly, an object of this invention is to provide a primer composition that can maintain strong adhesion even under conditions of high temperatures, in particular, in high-temperature oils, and yet has good air-drying properties, processability, and workability.

As a means for solving the above problems, this invention provides a primer composition comprising:

(A) an organosilicon compound formed by binding an organosilicon compound represented by the general formula (I):

wherein $R^1$ represents a substituted or unsubstituted $C_1$ to $C_8$ monovalent hydrocarbon group; X represents a group selected from the group consisting of a hydrogen atom, a $C_1$ to $C_5$ alkyl group such as a methyl group, an ethyl group or a propyl group, and a $C_2$ to $C_5$ alkoxyalkyl group; and a, b and c are a numeral within the range of $0 \leq a < 0.2$, $0 \leq b < 0.2$ and $1 < c < 4$, respectively, with an organopolysiloxane represented by the general formula (II):

wherein $R^2$ represents a substituted or unsubstituted $C_1$ to $C_8$ monovalent hydrocarbon group containing no aliphatic unsaturated group; $R^3$ represents a $C_2$ to $C_5$ alkenyl group, gamma-acryloxypropyl group or gamma-methacryloxypropyl group; Y represents a member selected from the group consisting of a hydrogen atom, a $C_1$ to $C_5$ alkyl group such as a methyl group, an ethyl group or a propyl group, and a $C_2$ to $C_5$ alkoxyalkyl group; and d, e and f are a numeral within the range of $1.8 < d < 2.2$, $0.004 < e < 0.2$ and $0 \leq f < 0.2$, respectively, and having a polymerization degree of from 10 to 500, by addition or condensation reaction in a proportion of from 0.05 to 0.5 in weight ratio of the compound of the general formula (I)/the organopolysioxane of the general formula (II);

(B) an organic titanate; and (C) an organic solvent.

The primer composition of this invention, when coated on the surface of a material such as a metal or plastics which is stable under normal conditions for vulcanization of silicone rubber, forms on its surface a coating that can be strongly adhered to silicone. This composition can be prepared with ease, and is also stable from the viewpoint of quality control. The adhesion surface thus formed is stable even in high-temperature oils of 200° C. or more. Moreover, this composition has good air-drying properties, can be well cured prior to the step of adhesion, and can form a coating showing a satisfactory strength. Hence, it does owing to the flow of an adherend rubber compound. It therefore can be used also in injection molding or transfer molding in which great pressure is applied.

DETAILED DESCRIPTION OF PREFERRED EMBODIMENTS OF THE INVENTION

Figure 1:
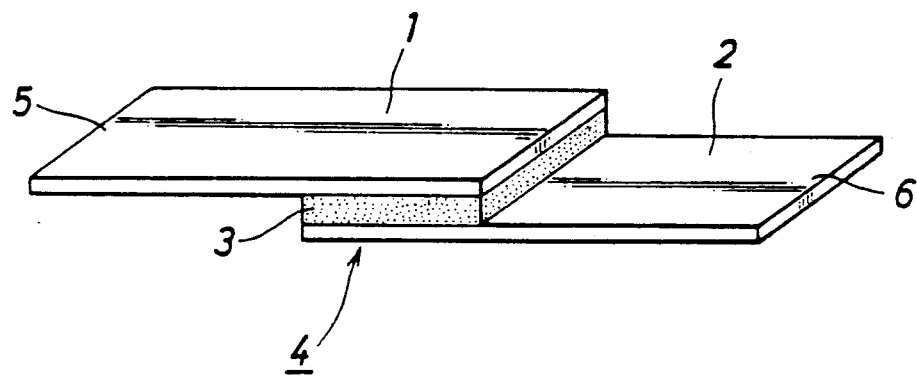
FIG. 1 illustrates a test specimen used in the measurement of adhesive force, carried out in Examples.

The organosilicon compound as the component (A) serves as the main component of the composition, and is an important component for achieving adhesion to the silicone rubber side.

The component (A) organosilicon compound is formed of the compound of the general formula (I) and the compound of the general formula (II).

In the general formula (I), the substituted or unsubstituted $C_1$ to $C_8$ monovalent hydrocarbon represented by $R^1$ includes, for example, an alkyl group such as a methyl group, an ethyl group or a propyl group, an aryl group such as a phenyl group or a tolyl group, a cycloalkyl group such as a cyclohexyl group, an alkenyl group such as a vinyl group or an allyl group, and substituted hydrocarbon groups wherein part or the whole of the hydrogen atoms possessed by the above hydrocarbon groups have been substituted with a halogen atom(s) such as fluorine or chlorine, or a cyano group, as exemplified by a cyanomethyl group, a chloromethyl group, and a gamma-trifluoropropyl group. $R^1$ is preferably the methyl and ethyl groups. In the general formula (I), X is preferably the methyl, ( ethyl or 2-methoxyethyl groups. And a is preferably a numeral of $0 < a \leqq 0.15$, and b is preferably a numeral of $0 \leqq b \leqq 0.15$ and c is a numeral of $2 \leqq c < 4$.

The compound represented by the general formula (I) includes, for example, methyl orthosilicate, ethyl orthosilicate, propyl orthosilicate, or condensates of these, and silicic compounds having a hydroxyl group, such as silica sol and silica gel. Preferred are, for example, $(C_2H_5)_{12}Si_5O_4$ and $H(CH_3)(C_2H_5O)_{12}Si_6O_5$.

In the general formula (II), the substituted or unsubstituted $C_1$ to $C_8$ monovalent hydrocarbon group containing no aliphatic unsaturated group, represented by $R^2$, includes, for example, an alkyl group such as a methyl group, an ethyl group, a propyl group or a butyl group, an aryl group such as a phenyl group or a tolyl group, a cycloalkyl group such as a cyclohexyl group, and groups wherein part or the whole of the hydrogen atoms bonded to the carbon atoms of the above hydrocarbon groups have been substituted with a halogen atom(s) such as fluorine or chlorine, or a cyano group, as exemplified by a chloromethyl group, a gamma-trifluoropropyl group and a cyanoethyl group, preferably, $R_2$ is the methyl, ethyl, phenyl or gamma-trifluoropropyl group. The $C_2$ to $C_5$ alkenyl group represented by $R^3$ includes, for example, a vinyl group, and an allyl group. The vinyl group is preferred. The total of the alkenyl, gamma-acryloyloxypropyl and gamma-methacryloyloxypropyl groups in the whole organic groups may be present in such an amount that the e in the general formula (II) ranges from 0.004 to 0.2, and preferably from 0.008 to 0.15. If these groups are present in too small an amount, good adhesion can not be obtained. If these are present in too large an amount, the thermal resistance of the resulting primer composition may be lowered. The Y in the general formula (II) preferably represents the methyl, ethyl or 2-methoxy group.

The compound of the general formula (II) may substantially contain a diorganosiloxane unit, a monoorganosiloxane unit or an $SiO_2$ unit. It may also be linear or branched.

On account of good adhesion to be obtained, the organopolysiloxane of the general formula (II) preferably has a polymerization degree, of from 10 to 500, and particularly from 50 to 200.

A preferred typical example of the compound of the general formula (II) includes a compound represented by the general formula (III):

  (III)

wherein $R^2$ is as defined above, and h is a numeral of 1.95 to 2.05, and terminated at at least one of the ends of the molecule with a group represented by $-(CH_2=CH)_gR^2_3$.

$_gSiO_{0.5}$, where $R^2$ is as defined above and g is an integer of 0 to 3. In particular, the compound wherein the methyl group comprises not less than 50 mol % of $R^2$ is preferred.

The component (A) organosilicon compound of this invention must be formed by the combination of the compound of the general formula (I) and the organopolysiloxane of the general formula (II). Use of both the compound of the general formula (I) and the compound of the general formula (II) which are not combined can not give the effect of this invention. The proportion of the compound of the general formula (I)/the compound of the general formula (II) may range from 0.05 to 0.5, and preferably from 0.06 to 0.5, in weight ratio. A proportion outside the above range may result in a lowering of adhesion.

The compound of the general formula (I) and the compound of the general formula (II) may be combined by either addition reaction or condensation reaction. Preferably, one end of the compound of the general formula (II) is bonded to the compound of the general formula (I): the resulting organosilicon compound preferably has on one side a hydroxyl group originating from the compound of the general formula (I) and has on the other side an alkenyl group. For example, in the instance where the compound of the general formula (I) has a hydrosilyl group, this group can be made to undergo addition reaction with the alkenyl group of the organosilicon compound of the general formula (II) in the presence of a platinum catalyst. Alternatively, in instances where the organosilicon compound of the general formula (I) has a hydroxyl group or alkoxyl group and the organopolysiloxane of the general formula (II) has an alkoxyl group or hydroxyl group at its terminal, these two compounds can be combined by dehydration or dealcoholation condensation between an alkoxyl group or hydroxyl group and an hydroxyl group.

The organic titanate used as the component (B) in this invention has the effect of imparting air-drying properties to the composition of this invention, conjointly with other components, and also remarkably improving the adhesion to metals or plastics. When, however, this component is used alone, it does not improve the adhesion to the surface of silicone rubber, and hence is unfit for practical use when used alone.

This organic titanate includes, for example, tetranormalpropyl titanate, tetraisopropyl titanate, tetranormalbutyl titanate, butyl titanate dimer, tetra(2-ethylhexyl)-titanate, and polymers of these. It is also possible to use titanium chelate compounds such as titanium acetylacetonate, poly(titanium acetylacetonate), titanium octyl glycote, titanium lactate, titanium lactate ethyl ester, and titanium triethanol aminate. Preferred are tetranormalpropyl titanate, tetraisopropyl titanate, tetranormalbutyl titanate, butyl titanate dimer, and tetra (2-ethylhexyl) titanate.

The organic solvent as the component (C) suitably used includes solvents capable of dissolving other components in the composition of this invention and achieves appropriate coating operation. It may preferably be selected on account of the solubility of the components, and the evaporation properties questioned when the composition is coated as the primer. It includes, for example, ligroin, toluene, xylene, hexane, ethyl acetate, benzene, heptane, isopropyl alcohol, methylene chloride, and trichloroethylene. These may be used alone or in the form of a mixture of two or more.

In the composition of the invention, the component (B) is preferably present in an amount of from 50 to 200 parts by weight, more preferably from 70 to 120 parts by weight, and the component (C) is preferably present in an amount of from 2,000 to 20,000 parts by weight, more preferably from 1,000 to 10,000 parts by weight, per 100 parts by weight of the component (A).

For the purpose of improving the air-drying properties of the composition of this invention or improving the coating strength, it is optional to further add at least one compound selected from an organosilicon compound represented by the general formula:

$$Si_nO_{n-1}(OR^4)_{2n+2}$$

wherein $R^4$ is a $C_1$ to $C_5$ alkyl group such as a methyl group, an ethyl group, a propyl group and a butyl group, a $C_2$ to $C_6$ alkoxyalkyl group such as a 2-methoxyethyl group, and 2-ethoxyethyl group, and n is an integer of from 1 to 20, a partial hydrolysis condensate thereof, and a polymer represented by the general formula:

$$Si_nO_{n-1}(OR^4)_{2n+2}R^5_n$$

wherein $R^4$ is as defined above; $R^5$ represents an an substituted or unsubstituted $C_1$ to $C_8$ monovalent hydrocarbon group, for example, monovalent hydrocabon groups exemplified by an alkyl group such as a methyl group, an ethyl group, a propyl group or a butyl group, an alkenyl group such as a vinyl group, and an allyl group, a gamma-acryloyloxypropyl group, a gamma-methacryloyloxypropyl group, an aryl group such as a phenyl group or a tolyl group, a cycloalkyl group such as a cyclohexyl group; and corresponding substituted hydrocarbon groups wherein part or the whole of the hydrogen atoms bonded to the carbon atoms of the above hydrocarbon groups have been substituted with a halogen atom(s) such as fluorine or chlorine, or a cyano group, as exemplified by a chloromethyl group, a gamma-trifluoropropyl group and a cyanoethyl group; and n is an integer of from 1 to 20.

These compounds may be added preferably in an amount of from 5 to 20 parts by weight per 100 parts by weights of the component (A).

Various inorganic fillers as exemplified by powdered silica may also be added and mixed for the purpose of further improving the strength of primer coatings after curing. Conventionally known heat-resistant agents, colorants and other additives such as red iron oxide, cerium oxide, cerium hydroxide, cerium fatty acid salts, iron fatty acid salts, titanium oxide, and carbon black may also be optionally further added so long as what is aimed in the present invention is not missed.

To prepare the composition of this invention, the above components (A) to (C) and other optional components may be merely mixed. It, however, is also effective to mix them with heating at 50° to 100° C. so that the compatibility can be further increased.

In some modes of use, the composition of this invention may preferably be coated on an substrate and thereafter air-dried for about 5 minutes or more before the primer coating is brought into adhesion to silicone rubber. In some instances, it is also effective to bake, after air-drying, the coating at a temperature within the range of from 100° to 200° C. in order to surely evaporate the solvent and accelerate the curing before the coating is adhered to silicone rubber.

The use of the composition of this invention as the primer brings about strong adhesion of silicone rubber to substrates made of, for example, various metals such as aluminum, stainless steel, nickel, chromium, zinc, tin, and copper, and alloys thereof, or synthetic resin materials such as acrylic resins, phenol resins, epoxy resins, Teflon, and PFA resins. Moreover, there can be exhibited the performance that the resulting adhesion is not lowered even when the products are exposed to high-temperature oils or water vapor.

Making the most of such characteristic features, the present composition is effectively used as a primer when, for example, silicone rubber is adhered to a housing of an oil seal, silicone rubber is adhered to a mandrel of a roll of a copying machine, a PFA tube is adhered to silicone rubber of the roll of a copying machine, silicone rubber is adhered to a mandrel of an engine mount, silicone rubber is adhered to iron of a mouth pad used for office automation, and silicone rubber is adhered to other metals or synthetic resins Synthesis examples and working examples of the primer composition will be described below. In the following, "part(s)" refers to part(s) by weight.

COMPARATIVE EXAMPLE 1

With 10 parts of ethyl silicate 40 (a product of Colcoat Co., Ltd.), which is a mixture of lower condensates of ethyl orthosilicate, 0.6 part of 1,3,5,7-tetramethylcyclotetrasiloxane was mixed, and 1,000 ppm of trifluoromethanesulfonic acid was added thereto, and the mixture was stirred for 4 hours in a stream of nitrogen.

The resulting mixture was thereafter neutralized with sodium hydrogencarbonate, dewatered and filtered using magnesium sulfate, and then diluted with toluene. The resulting solution was added dropwise in a mixed solution heated to 100° C., containing i) 6.3 parts of an organopolysiloxane oil (polymerization degree: 8) composed of 75.00 mol % of $(CH_3)_2SiO$ units and 25.00 mol % of both-end terminating $(CH_3)_2(CH_2=CH)SiO_{\frac{1}{2}}$ units and ii) a chloroplatinic acid solution in octyl alcohol in an amount of 100 ppm in terms of platinum content. Then, the toluene was removed at 100° C. under a reduced pressure of 10 Torr to give a product. Five(5) parts of the product thus obtained, 3 parts of titanium tetrabutoxide, 5 parts of a silicone rubber compound KE560NU (a product of Shin-Etsu Chemical Co., Ltd.), and 100 parts of ligroin were thoroughly mixed to give a primer.

EXAMPLE 1

With 10 parts of ethyl silicate 40 (a product of Colcoat Co., Ltd.), which is a mixture of a lower condensate of ethyl orthosilicate, 0.6 part of 1,3,5,7-tetramethylcyclotetrasiloxane was mixed, and 1,000 ppm of trifluoromethanesulfonic acid was added thereto, and the mixture was stirred for 4 hours in a stream of nitrogen.

The resulting mixture was thereafter neutralized with sodium hydrogenoarbonate, dewatered and filtered using magnesium sulfate, and then diluted with toluene. The resulting solution was dropwise added in a mixed solution heated to 100° C., containing i) 50 parts of an organopolysiloxane (polymerization degree: 65) composed of 96.92 mol % of $(CH_3)_2SiO$ units and 3.08 mol % of both-end terminating $(CH_3)_2(CH_2=CH)SiO_{\frac{1}{2}}$ units and ii) a chloroplatinic acid solution in octyl alcohol in an amount of 100 ppm in terms of platinum content. Then, the toluene was removed at 100° C. under a reduced pressure of 10 Torr to give a product. Five(5) parts of the product thus obtained, 3 parts of titanium tetrabutoxide, 5 parts of a silicone rubber compound KE560NU (a product of Shin-Etsu Chemical Co., Ltd.), and 100 parts of ligroin were thoroughly mixed to give a primer composition.

EXAMPLE 2

With 10 parts of ethyl silicate 40 (a product of Colcoat Co., Ltd.), 0.6 part of 1,3,5,7-tetramethylcyclotetrasiloxane was mixed, and 1,000 ppm of trifluoromethanesulfonic acid was added thereto, and the mixture was stirred for 4 hours in a stream of nitrogen. The resulting mixture was thereafter neutralized with sodium hydrogencarbonate, dewatered and filtered using magnesium sulfate, and then diluted with toluene. The resulting solution was dropwise added in a mixed solution heated to 100°0 C., containing i) 105 parts of an organopolysiloxane oil (polymerization degree: 140) composed of 98.57 mol % of $(CH_3)_2SiO$ units and 1.43 mol % of both-end terminating $(CH_3)_2(CH_2=CH)SiO_{\frac{1}{2}}$ units and ii) a chloroplatinic acid solution in octyl alcohol in an amount of 100 ppm in terms of platinum content. Then, the toluene was removed at 100° C. under a reduced pressure of 10 Torr to give a product. Five(5) parts of the product thus obtained, 3 parts of titanium tetrabutoxide, 5 parts of a silicone rubber compound KE560NU (a product of Shin-Etsu Chemical Co., Ltd.), and 100 parts of ligroin were thoroughly mixed to give a primer composition.

EXAMPLE 3

With 10 parts of ethyl silicate 40 (a product of Colcoat Co., Ltd.), 0.6 part of 1,3,5,7-tetramethylcyclotetrasiloxane was mixed, and 1,000 ppm of trifluoromethanesulfonic acid was added thereto, and the mixture was stirred for 4 hours in a stream of nitrogen. The resulting mixture was thereafter neutralized with sodium hydrogencarbonate, dewatered and filtered using magnesium sulfate, and then diluted with toluene. The resulting solution was dropwise added in a mixed solution heated to 100° C., containing i) 340 parts of an organopolysiloxane oil (polymerization degree: 450) composed of 99.56 mol % of $(CH_3)_2SiO$ units and 0.44 mol % of both-end terminating $(CH_3)_2(CH_2=CH)SiO_{\frac{1}{2}}$ units and ii) a chloroplatinic acid solution in octyl alcohol in an amount of 100 ppm in terms of platinum content. Then, the toluene was removed at 100° C. under a reduced pressure of 10 Torr to give a product. Five(5) parts of the product thus obtained, 3 parts of titanium tetrabutoxide, 5 parts of a silicone rubber compound KE560NU (a product of Shin-Etsu Chemical Co., Ltd.), and 100 parts of ligroin were thoroughly mixed to give a primer composition.

COMPARATIVE EXAMPLE 2

With 10 parts of ethyl silicate 40 (a product of Colcoat Co., Ltd.), 0.6 part of 1,3,5,7-tetramethylcyclotetrasiloxane was mixed, and 1,000 ppm of trifluoromethanesulfonic acid was added thereto, and the mixture was stirred for 4 hours in a stream of nitrogen. The resulting mixture was thereafter neutralized with sodium hydrogencarbonate, dewatered and filtered using magnesium sulfate, and then diluted with toluene. The resulting solution was dropwise added in a mixed solution heated to 100° C., containing i) 450 parts of an organopolysiloxane oil (polymerization degree: 600) composed of 99.67 mol % of $(CH_3)_2SiO$ units and 0.33 mol % of both-end terminating $(CH_3)_2(CH_2=CH)SiO_{\frac{1}{2}}$ units and ii) a chloroplatinic acid solution in octyl alcohol in an amount of 100 ppm in terms of platinum content. Then, the toluene was removed at 100° C. under a reduced pressure of 10 Torr to give a product. Five(5) parts of the product thus obtained, 3 parts of titanium tetrabutoxide, 5 parts of a silicone rubber compound KE560NU (a product of Shin-Etsu Chemical Co., Ltd.), and 100 parts of ligroin were thoroughly mixed to give a primer composition.

COMPARATIVE EXAMPLE 3

With 10 parts of ethyl silicate 40 (a product of Colcoat Co., Ltd.), 0.6 part of 1,3,5,7-tetramethylcyclotetrasiloxane was mixed and 1,000 ppm of trifluoromethanesulfonic acid was added thereto, and the mixture was stirred for 4 hours in a stream of nitrogen. The resulting mixture was thereafter neutralized with sodium hydrogencarbonate, dewatered and filtered using magnesium sulfate, and then diluted with toluene. The resulting solution was dropwise added in a mixed solution heated to 100° C., containing i) 105 parts of an organopolysiloxane oil (polymerization degree: 140) composed of 98.57 mol % of $(CH_3)_2SiO$ units. 0.71 mol % of one-end terminating $(CH_3)_2(CH_2=CH)SiO_{\frac{1}{2}}$ units, and 0.71 mol % of the other-end terminating $(CH_3)_3SiO_{\frac{1}{2}}$ units and ii) a chloroplatinic acid solution in octyl alcohol in an amount of 100 ppm in terms of platinum content. Then, the toluene was removed at 100° C. under a reduced pressure of 10 Torr to give a product. Five(5) parts of the product thus obtained, S parts of titanium tetrabutoxide, 5 parts of a silicone rubber compound KE660NU (a product of Shin-Etsu Chemical Co., Ltd.), and 100 parts of ligroin were thoroughly mixed to give a primer composition.

COMPARATIVE EXAMPLE 4

Five(5) parts of a mixture obtained by mixing 10 parts of ethyl silicate 40 (a product of Colcoat Co., Ltd.) with 105 parts of an organopolysiloxane oil (polymerization degree: 140) composed of 98.57 mol % of $(CH_3)_2SiO$ units, 1.43 mol % of both-end terminating $(CH_3)_2(CH_2=CH)SiO_{\frac{1}{2}}$ units; 3 parts of titanium tetrabutoxide: 5 parts of a silicone rubber compound KE560NU (a product of Shin-Etsu Chemical Co., Ltd.); and 100 parts of ligroin were thoroughly mixed to give a primer composition.

COMPARATIVE EXAMPLE 5

With 80 parts of ethyl silicate 40 (a product of Colcoat Co., Ltd.), 0.6 part of 1,3,5,7-tetramethylcyclotetrasiloxane was mixed, and 1,000 ppm of trifluoromethanesulfonic acid was added thereto, and the mixture was stirred for 4 hours in a stream of nitrogen. The resulting mixture was thereafter neutralized with sodium hydrogencarbonate, dewatered and filtered using magnesium sulfate, and then diluted with toluene. The resulting solution was dropwise added in a mixed solution heated to 100° C., containing i) 105 parts of an organopolysiloxane oil (polymerization degree: 140) composed of 98.57 mol % of $(CH_3)_2SiO$ units and 1.43 mol % of both-end terminating $(CH_3)_2(CH_2=CH)SiO_{\frac{1}{2}}$ units and ii) a chloroplatinic acid solution in octyl alcohol in an amount of 100 ppm in terms of platinum content. Then, the toluene was removed at 100° C. under a reduced pressure of 10 Torr to give a product. Five(5)

parts of the product thus obtained, 3 parts of titanium tetrabutoxide, 5 parts of a silicone rubber compound KE560NU (a product of Shin-Etsu Chemical Co., Ltd.), and 100 parts of ligroin were thoroughly mixed to give a primer composition.

EXAMPLE 4

With 40 parts of ethyl silicate 40 (a product of Colcoat Co., Ltd.), 0.6 part of 1,3,5,7-tetramethylcyclotetrasiloxane was mixed, and 1,000 ppm of trifluoromethanesulfonic acid was added thereto, and the mixture was stirred for 4 hours in a stream of nitrogen. The resulting mixture was thereafter neutralized with sodium hydrogencarbonate, dewatered and filtered using magnesium sulfate, and then diluted with toluene. The resulting solution was dropwise added in a mixed solution heated to 100° C., containing i) 105 parts of an organopolysiloxane oil (polymerization degree: 140) composed of 98.57 mol % of $(CH_3)_2SiO$ units and 1.43 mol % of both-end terminating $(CH_3)_2(CH_2=CH)SiO_{\frac{1}{2}}$ units and ii) a chloroplatinic acid solution in octyl alcohol in an amount of 100 ppm in terms of platinum content. Then, the toluene was removed at 100° C. under a reduced pressure of 10 Torr to give a product. Five(5) parts of the product thus obtained, 3 parts of titanium tetrabutoxide, 5 parts of a silicone rubber compound KE560NU (a product of Shin-Etsu Chemical Co., Ltd.), and 100 parts of ligroin were thoroughly mixed to give a primer composition.

EXAMPLE 5

With 20 parts of ethyl silicate 40 (a product of Colcoat Co., Ltd.), 0.6 part of 1,3,5,7-tetramethylcyclotetrasiloxane was mixed, and 1,000 ppm of trifluoromethanesulfonic acid was added thereto, and the mixture was stirred for 4 hours in a stream of nitrogen.

The resulting mixture was thereafter neutralized with sodium hydrogencarbonate, dewatered and filtered using magnesium sulfate, and then diluted with toluene. The resulting solution was dropwise added in a mixed solution heated to 100° C., containing i) 105 parts of an organopolysiloxane oil (polymerization degree: 140) composed of 98.57 mol % of $(CH_3)_2SiO$ units and 1.43 mol % of both-end terminating $(CH_3)_2(CH_2=CH)SiO_{\frac{1}{2}}$ units and ii) a chloroplatinic acid solution in octyl alcohol in an amount of 100 ppm in terms of platinum content. Then, the toluene was removed at 100° C. under a reduced pressure of 10 Torr to give a product. Five(5) parts of the product thus obtained, 3 parts of titanium tetrabutoxide, 5 parts of a silicone rubber compound KE560NU (a product of Shin-Etsu Chemical Co., Ltd.), and 100 parts of ligroin were thoroughly mixed to give a primer composition.

COMPARATIVE EXAMPLE 6

With 4 parts of ethyl silicate 40 (a product of Colcoat Co., Ltd.), 0.6 part of 1,3,5,7-tetramethylcyclotetrasiloxane was mixed, and 1,000 ppm of trifluoromethanesulfonic acid was added thereto, and the mixture was stirred for 4 hours in a stream of nitrogen. The resulting mixture was thereafter neutralized with sodium hydrogencarbonate, dewatered and filtered using magnesium sulfate, and then diluted with toluene. The resulting solution was dropwise added in a mixed solution heated to 100° C., containing i) 105 parts of an organopolysiloxane oil (polymerization degree: 140) composed of 98.57 mol % of $(CH_3)_2SiO$ units and 1.43 mol % of both-end terminating $(CH_3)_2(CH_2=CH)SiO_{\frac{1}{2}}$ units and ii) a chloroplatinic acid solution in octyl alcohol in an amount of 100 ppm in terms of platinum content. Then, the toluene was removed at 100° C. under a reduced pressure of 10 Torr to give a product. Five(5) parts of the product thus obtained, 3 parts of titanium tetrabutoxide, 5 parts of a silicone rubber compound KE560NU (a product of Shin-Etsu Chemical Co., Ltd.), and 100 parts of ligroin were thoroughly mixed to give a primer composition.

EVALUATION

In the following, 0.5 part of 2.5-dimethyl-2,5-di(t-butylperoxyhexane was incorporated into and well dispersed in 100 parts of a silicone rubber compound KE555U (a product of Shin-Etsu Chemical Co., Ltd.), using a two roll mill to give an unvulcanized rubber.

A primer was coated on two test pieces (1, 2) 1 inch wide, made of iron, whose surfaces had been cleaned by thorough washing with gasoline or the like. The test pieces 1 and 2 were each air-dried at room temperature for 30 minutes, and then baked at 150° C. for 10 minutes. Thereafter, as FIG. 1 shows, the primer-coated surfaces of the two test pieces 1 and 2 were put, overlapping each other by 1 square inches, between which the unvulcanized rubber 3 was inserted, and these were contact-bonded at 50 kg/cm², followed by press curing at 165° C. for 10 minutes. A test specimen 4 as shown in the drawing was thus obtained. The gripping ends 5 and 6 of the test specimen was clamped in the jaws of a tensile testing machine. A tensile load was applied thereto by pulling the test specimen at a rate of 1 mm per minute until the test specimen broke. The maximum load applied was measured, which was regarded as the adhesive force.

EVALUATION EXAMPLE 1

Table 1 shows the results of evaluation carried out using the primer compositions according to Examples 1, 2 and 3 and Comparative Examples 1 and 2. The primer compositions containing there action product of the organopolysiloxane having a polymerization degree of 65, 140 or 450, as the compound of the general formula (II), showed strong adhesion. In particular, the primer composition of Example 3. containing the reaction product of the organopolysiloxane having the polymerization degree of 140, showed a greatest value. Peeled test pieces of each test specimen were also observed to reveal that the test pieces were peeled at the boundary surfaces between primer and rubber in the case of Comparative Example 1, the cohesive failure occurred in the primer layer in the cases of Examples 1 to 3, and the test pieces were peeled at the boundary surfaces between primer and iron in the case of Comparative Example 2.

TABLE 1

|  | Comparative Example | Example | | | Comparative Example |
|---|---|---|---|---|---|
|  | 1 | 1 | 2 | 3 | 2 |
| Degree of polymerization of organopolysiloxane of general formula (II): | 8 | 65 | 140 | 450 | 600 |
| Adhesive force (kgf/cm²): | 14 | 21 | 24 | 16 | 8 |

EVALUATION EXAMPLE 2

Table 2 shows the results of evaluation on the primer compositions according to Example 2 and Comparative Examples 3 and 4. The primer composition of Example 2, which contains the reaction product between the ethyl silicate 40 and organopolysiloxane, terminated with unsaturated groups, shows a large adhesive force as compared with the primer composition of Comparative Example 3, which contains the reaction product between the ethyl silicate 40 and organopolysiloxane, having no unsaturated group. Thus, the presence of the unsaturated groups at the organopolysiloxane moiety is effective for adhesion. The primer composition of Comparative Example 4, which contains the mixture of the ethyl silicate 40 and organopolysiloxane, shows a poor adhesive force. Thus, the primer proves to be effective when it contains as an adhesion component the reaction product between the ethyl silicate 40 and the organopolysiloxane.

TABLE 2

|  | Comparative Example 3 | Example 2 | Comparative Example 4 |
|---|---|---|---|
| Adhesive force (kgf/cm$^2$): | 6 | 24 | 12 |

EVALUATION EXAMPLE 3

Table 3 shows the results of evaluation on the primer compositions according to Examples 2, 4 and 5 and Comparative Examples 5 and 6. The primer compositions of the Examples, which have a weight ratio within the range of from 0.05 to 0.5 for the reaction between the ethyl polysilicate 40 (a compound of the general formula (II))/the organopolysiloxane oil (a compound of the general formula (I)) are seen to show a strong adhesive force.

TABLE 3

|  | Comparative Example 5 | Example 4 | Example 5 | Example 2 | Comparative Example 6 |
|---|---|---|---|---|---|
| (I)/(II)*: | 0.76 | 0.38 | 0.19 | 0.096 | 0.004 |
| Adhesive force (kgf/cm$^2$): | 10 | 26 | 27 | 24 | 14 |

*Weight ratio of the compound of the general formula (I)/the organopolysiloxane of the general formula (II)

EVALUATION EXAMPLE 4

The primer composition of Example 1 was coated on a surface to be treated of an ethylene tetrafluoride/perfluorovinyl ether copolymer (PFA) sheet (a product of Gunze Sangyo, Inc.; FST non-shrink type), and the coating was air-dried. Thereafter, a high-temperature addition curing silicone of a liquid type was brought into close contact with the coating, followed by heating at 150° C. for 10 minutes to cause the silicone rubber to cure and adhere to another PFA sheet of the same type as above. The silicone rubber thus adhered was chopped perpendicularly to the PFA surface at intervals of 1 mm, and a tensile test was carried out by pulling the test specimen until it is broken. The silicone rubber was broken as a result of the pulling of the test specimen, but there occurred no peeling of silicone rubber from the PFA sheet.

We claim:

1. A primer composition comprising:
   (A) an organosilicon compound formed by binding an organosilicon compound represented by the general formula (I):

$$H_a(R^1)_b(XO)_cSiO_{\frac{4-a-b-c}{2}} \quad (I)$$

wherein $R^1$ represents a substituted or unsubstituted $C_1$ to $C_8$ monovalent hydrocarbon group; X represents a group selected from the group consisting of a hydrogen atom, a $C_1$ to $C_5$ alkyl group and a $C_2$ to $C_5$ alkoxyalkyl group; and a, b and c are a numeral within the range of $0 \leq a < 0.2$, $0 \leq b < 0.2$ and $1 < c < 4$, respectively, with an organopolysiloxane represented by the general formula (II):

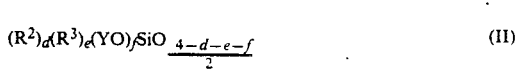

$$(R^2)_d(R^3)_e(YO)_fSiO_{\frac{4-d-e-f}{2}} \quad (II)$$

wherein $R^2$ represents a substituted or unsubstituted $C_1$ to $C_8$ monovalent hydrocarbon group containing no aliphatic unsaturated group; $R^3$ represents a $C_2$ to $C_6$ alkenyl group, a gamma-acryloyloxypropyl group or a gamma-methacryloyloxypropyl group; Y represents a member selected from the group consisting of a hydrogen atom, a $C_1$ to $C_5$ alkyl group and a $C_2$ to $C_6$ alkoxyalkyl group; and d, e and f are a numeral within the range of $1.8 < d < 2.2$, $0.004 < e < 0.2$ and $0 \leq f < 0.2$, respectively, and having a polymerization degree of from 10 to 500, by addition or condensation reaction in a proportion of from 0.05 to 0.5 in weight ratio of the compound of the general formula (I)/the organopolysiloxane of the general formula (II);
   (B) an organic titanate; and
   (C) an organic solvent.

2. The composition of claim 1, wherein a, b, and C in the general formula (I) are a numeral of $0 < a \leq 0.15$, $0 < b \leq 0.15$, and $2 \leq c < 4$, respectively.

3. The composition of claim 1, wherein the organosilicon compound of the general formula (I) is a silicic compound having a hydroxyl group.

4. The composition of claim 1, wherein the organopolysiloxane having the general formula (II) is the compound having the general formula (III):

$$R_h^2SiO_{\frac{4-h}{2}} \quad (III)$$

wherein $R^2$ is as defined above, and h is a numeral of from 1.95 to 2.05,
   and terminated at at least one of the ends of the molecule with a group of $-(CH_2=CH)_gR^2_{3-g}SiO_{0.5}$, where $R^2$ is as defined above and g is an integer of from 0 to 3.

5. The composition of claim 4, wherein the methyl group comprises at least 50 mol % of $R^2$ in the general formula (III).

6. The composition of claim 1, wherein the weight ratio of the organosilicon compound having the general formula (I)/the organopolysiloxane having the general formula (II) is in a range of from 0.06 to 0 5.

7. The composition of claim 1, wherein the component (B) is selected from the group consisting of tetranormalpropyl titanate, tetraisopropyl titanate, tetranormalbutyl titanate, butyl titanate dimer, and tetra(2-ethylhexyl) titanate.

8. The composition of claim 1, wherein the component (C) is ligroin, toluene, xylene, hexane, ethyl acetate, benzene, heptane, isopropyl alcohol, methylene chloride, trichloroethylene or a mixed solvent of two or more of them.

9. The composition of claim 1 comprising the component (B) in an amount of from 50 to 200 parts by weight and the component (C) in an amount of from 2,000 to 20,000 parts by weight, per 100 parts by weight of the component (A).

10. The composition of claim 1 which further comprises at least one compound selected from the group consisting of an organosilicon compound having the general formula:

$$Si_nO_{n-1}(OR^4)_{2n+2}$$

wherein $R^4$ represents a $C_1$ to $C_5$ alkyl group or a $C_2$ to $C_5$ alkoxyalkyl group, and n represents an integer of from 1 to 20,
a partial hydrolysis condensate thereof, and a polymer having the general formula:

$$Si_nO_{n-1}(OR^4)_{2n+2}R^5_n$$

wherein $R^4$ is as defined above, $R^5$ represents a substituted or unsubstituted $C_1$ to $C_8$ monovalent hydrocarbon group, and n is an integer of from 1 to 20,
in an amount of from 5 to 20 parts by weight per 100 parts by weight of the component (A).

* * * * *